United States Patent
Conner

[15] 3,692,329
[45] Sept. 19, 1972

[54] STABILIZING UNITS FOR PARKED VEHICLES

[72] Inventor: Tom E. Conner, P.O. Drawer BB, Elk Grove, Calif. 95624

[22] Filed: Jan. 4, 1971

[21] Appl. No.: 103,517

[52] U.S. Cl.................................280/150.5, 254/86 R
[51] Int. Cl.....................................................B60s 9/02
[58] Field of Search...280/150.5; 296/23 R; 248/351, 248/352, 354 S, 436, 188.4; 254/86 R

[56] References Cited

UNITED STATES PATENTS

| | | | |
|---|---|---|---|
| 3,155,373 | 11/1964 | Rae | 254/86 R |
| 2,519,364 | 8/1950 | Fredholm | 280/150.5 |
| 3,489,428 | 1/1970 | Hunter | 280/150.5 |

*Primary Examiner*—Benjamin Hersh
*Assistant Examiner*—Robert R. Song
*Attorney*—Webster & Webster

[57] ABSTRACT

A plurality of stabilizing units are detachably mounted on a parked vehicle—such as a house trailer or mobile home—in predetermined spaced relation thereon and serve to stabilize the vehicle against both longitudinal and lateral rocking motion; each such unit, which is in the nature of a stand, including a pair of downwardly divergent legs which are manually adjustable in length in order to place the same under load between the vehicle and a ground-engaging pad attached to the lower end of each of said legs.

2 Claims, 4 Drawing Figures

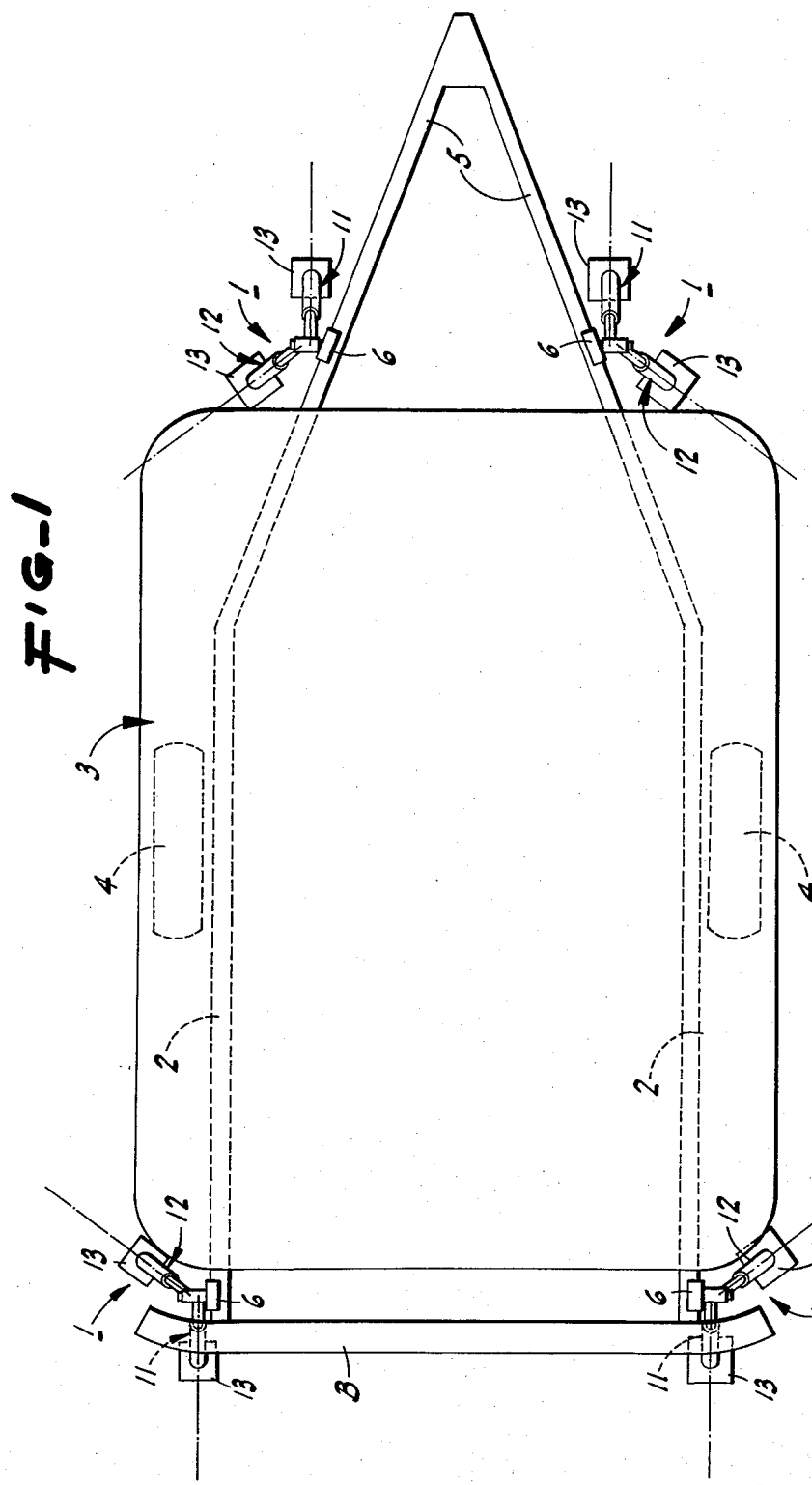

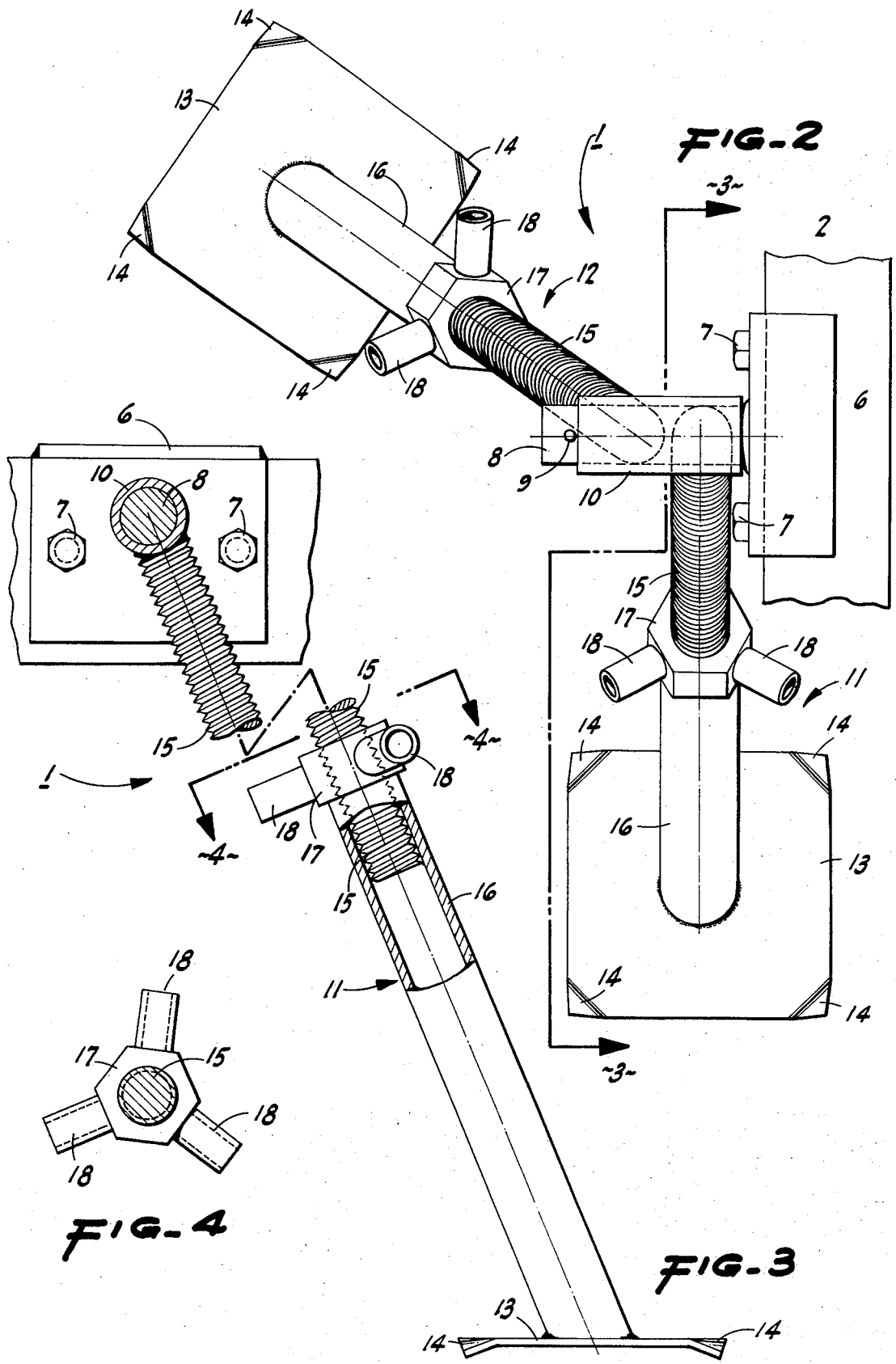

STABILIZING UNITS FOR PARKED VEHICLES

BACKGROUND OF THE INVENTION

In order to stabilize a parked vehicle—such as a house trailer or mobile home—it is a conventional practice to dispose a vertical, one-legged screw jack adjacent each corner of the vehicle frame; the screw jack then being run down into ground engagement and locked up. While stabilizer units of this form generally serve the intended purpose, they are objectionable in that there is permitted a certain amount of longitudinal and lateral motion or rocking of the vehicle as a person moves about therein. The present invention was conceived in seeking a solution to such problem.

SUMMARY OF THE INVENTION

The present invention provides, as a major object, stabilizing units for a parked vehicle— of the type described—which are constructed and mounted in a manner which provide maximum stability and a substantially absent possibility of either longitudinal or lateral motion or rocking of the vehicle as a person moves about therein; this assuring against vehicle-motion discomfort otherwise experienced by such person.

The present invention provides, as another object, stabilizing units, as above, wherein each such unit is mounted on the vehicle frame and includes a pair of downwardly divergent legs readily manually adjustable in length in order to place the same under load between such frame and a ground-engaging pad attached to the lower end of each such leg; the specific angular relation of the legs to each other and to the frame being of importance in attaining the desired result; i.e., both longitudinal and lateral stability of the vehicle when parked.

The present invention provides, as still another object, stabilizing units, for the purpose described, which in the main are detachably mounted in connection with the frame of the vehicle whereby the units can be detached and stored on board for transport with the vehicle; detachment of the units being accomplished manually with ease.

The present invention provides, as a further object, stabilizing units for parked vehicles which are designed for ease and economy of manufacture.

The present invention provides, as a still further object, practical, reliable, and durable stabilizing units for parked vehicles and which are exceedingly effective for the purpose for which they are designed.

BRIEF DESCRIPTION OF THE DRAWINGS

FIG. 1 is a plan view showing a house trailer or mobile home in outline and with the stabilizing units mounted thereon.

FIG. 2 is an enlarged plan view of one of the rear stabilizing units as mounted on the vehicle frame.

FIG. 3 is a sectional elevation, partly broken away, of such unit; the view being taken substantially on line 3—3 of FIG. 2.

FIG. 4 is a cross section taken substantially on line 4—4 of FIG. 3.

DESCRIPTION OF THE PREFERRED EMBODIMENT

Referring now more particularly to the drawings and to the characters of reference marked thereon, the present invention contemplates the use of four individual stabilizing units, each indicated generally at 1. In use, two of the stabilizing units 1 are mounted in transversely spaced alined relation on rear portions of corresponding longitudinal frame beams 2, and ahead of the rear bumper B, of a vehicle 3—such as a house trailer or mobile home having supporting wheels 4. The other two of the stabilizing units 1 are mounted in transversely spaced, alined relation on the forwardly converging draft hitch-forming front portions 5 of corresponding frame beams 2.

Except in the respects hereinafter noted, the stabilizing units 1 are of like construction and, therefore, a description thereof in the singular will suffice.

Understanding that the stabilizing units 1 are provided in right and left-hand embodiments for mounting on corresponding sides of the vehicle 3, each such unit 1 is constructed as follows:

An attachment bracket 6 is secured by bolts 7 to the related portion of the corresponding frame beam 2, and such bracket is fitted with a short, laterally outwardly projecting trunnion 8 disposed at a right angle to the length of the vehicle; the trunnion being formed adjacent its outer end with a diametral hole 9. A short, turnable sleeve 10 is engaged in matching but detachable relation on the trunnion 8; the sleeve being adapted to be retained on the trunnion by a holding pin (not shown) passed through the hole 9.

A pair of legs, indicated generally at 11 and 12, are welded at their upper ends to the sleeve 10 and thence extend downward—in divergent relation—to fixed connection at their lower ends with flat, rectangular ground-engaging pads 13 whose corners are bent downward to form anti-slip prongs 14.

The legs 11 and 12 are each sectional and comprise a threaded upper section 15 and a tubular lower section 16; the lower part of the upper section telescoping into the upper part of the lower section as shown. A heavy-duty nut 17 is threaded on the upper section 15 and bears against the upper end of the lower section 16; adjustment of the nut—to alter the extent of telescoping of section 15 into section 16 and hence to change the effective length of the related leg (11 or 12)—being readily manually accomplished by spider arms 18 radiating from such nut.

The downwardly divergent legs 11 and 12, of each stabilizing unit 1, are fixed to the sleeve 10 in relative positions such that the leg 11 extends at a downward and outward incline lengthwise of the vehicle, while the leg 12 extends at a downward and outward incline laterally of the vehicle. Additionally, as also shown in FIG. 1, the laterally outwardly inclined legs 12 of the rear pair of units 1 are canted forwardly while the laterally outwardly inclined legs 12 of the front pair of units 1 are canted rearwardly.

Thus, on each side of the vehicle, the legs 11 have relative upward convergence lengthwise of the vehicle, while the legs 12 on such side have relative upward divergence. Also, the legs 12 of the pair at the rear of the vehicle—as well as those of the pair at the front thereof—have relative upward convergence transversely of said vehicle.

By reason of the foregoing particular angular disposition of the downwardly divergent legs 11 and 12 relative to each other in each unit 1, and to the corresponding legs of the other units 1, as well as to the vehicle, maximum stability of said vehicle—as a platform for movement of a person thereon—is attained when the stabilizing units are in use.

In use of the stabilizing units 1, the legs 11 and 12 are manually length-adjusted by the nuts 17 until all the pads 13 bear forcefully against the ground and so that the prongs 14 bite into the ground and prevent slippage of such pads. The units 1 then effectively stabilize the parked vehicle against lengthwise as well as lateral movement.

When the vehicle is being prepared for road travel, each of the stabilizing units 1 is detached and stored on board; this being accomplished by removing the sleeves 10 from the trunnions 8.

From the foregoing description, it will be readily seen that there has been produced such stabilizing units for parked vehicles as substantially fulfills the objects of the invention, as set forth herein.

While this specification sets forth in detail the present and preferred construction of the stabilizing units for parked vehicles, still in practice such deviations from such detail may be resorted to as do not form a departure from the spirit of the invention as defined by the appended claims.

I claim:

1. A stabilizing unit, for a parked vehicle having a frame, comprising a member adapted for attachment to the frame, means to secure said member to the frame, and a pair of legs fixed on such member and extending downwardly in divergent relation to ground engagement; one leg inclining downwardly and outwardly lengthwise of the vehicle, and the other leg inclining downwardly and outwardly laterally of the vehicle; said member being a sleeve, and the securing means comprising a bracket fixed to the frame, and a trunnion rigid with and projecting from the bracket, the sleeve being disposed on the trunnion.

2. A stabilizing unit, for a parked vehicle having a frame, comprising a member adapted for attachment to the frame, means to secure said member to the frame, and a pair of legs fixed on such member and extending downwardly in divergent relation to ground engagement; one leg inclining downwardly and outwardly lengthwise of the vehicle, and the other leg inclining downwardly and outwardly laterally of the vehicle; each leg being manually adjustable in length and including one section which telescopes into another section, such one section being threaded, a nut on said threaded section bearing against the adjacent end of said other section, and spider arms radiating from the nut.

* * * * *